(12) United States Patent
Sakai

(10) Patent No.: US 9,479,108 B2
(45) Date of Patent: Oct. 25, 2016

(54) ELECTRIC COMPRESSOR

(71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 32 days.

(21) Appl. No.: 14/415,098

(22) PCT Filed: Jun. 6, 2013

(86) PCT No.: PCT/JP2013/003553
§ 371 (c)(1),
(2) Date: Jan. 15, 2015

(87) PCT Pub. No.: WO2014/013666
PCT Pub. Date: Jan. 23, 2014

(65) Prior Publication Data
US 2015/0295532 A1    Oct. 15, 2015

(30) Foreign Application Priority Data
Jul. 17, 2012   (JP) .................................. 2012-158973

(51) Int. Cl.
| | | |
|---|---|---|
| *G05B 5/00* | (2006.01) | |
| *G05D 23/00* | (2006.01) | |
| *H02P 29/02* | (2016.01) | |
| *F04B 49/06* | (2006.01) | |
| *H02M 7/5387* | (2007.01) | |
| *H02P 29/00* | (2016.01) | |
| *F04C 28/06* | (2006.01) | |
| *F04C 28/28* | (2006.01) | |
| *F04B 35/04* | (2006.01) | |
| *F04B 49/10* | (2006.01) | |
| *H02P 27/08* | (2006.01) | |
| *H02H 7/08* | (2006.01) | |
| *G06F 1/06* | (2006.01) | |
| *H02P 23/00* | (2016.01) | |
| *H02H 6/00* | (2006.01) | |
| *H02M 1/32* | (2007.01) | |
| *F04C 18/02* | (2006.01) | |
| *F04C 29/04* | (2006.01) | |
| *H02M 1/36* | (2007.01) | |

(52) U.S. Cl.
CPC ............... *H02P 29/02* (2013.01); *F04B 35/04* (2013.01); *F04B 49/06* (2013.01); *F04B 49/065* (2013.01);
(Continued)

(58) Field of Classification Search
CPC .......... G06F 1/206; H02H 6/00; H02H 7/08; H02P 23/0072; B25F 5/00
USPC ....................................................... 318/472
See application file for complete search history.

(56) References Cited

U.S. PATENT DOCUMENTS

| | | | |
|---|---|---|---|
| 2007/0052382 A1* | 3/2007 | Nomura | H02P 29/02 318/400.08 |
| 2011/0031922 A1* | 2/2011 | Sakai | H02P 23/22 318/519 |
| 2013/0175964 A1 | 7/2013 | Watanabe | |

FOREIGN PATENT DOCUMENTS

| | | |
|---|---|---|
| JP | 2000297764 A | 10/2000 |
| JP | 2006157987 A | 6/2006 |

(Continued)

OTHER PUBLICATIONS

International Search Report and Written Opinion (in Japanese with English Translation) for PCT/JP2013/003553, mailed Sep. 10, 2013; ISA/JP.

*Primary Examiner* — Shawki S Ismail
*Assistant Examiner* — Bradley Brown
(74) *Attorney, Agent, or Firm* — Harness, Dickey & Pierce, P.L.C.

(57) ABSTRACT

A controller for an electric compressor sets a temperature rise region A, a temperature drop region B, and a steady region C from change in temperature of switching elements, and sets a carrier frequency for each of the set regions. In the region A, the carrier frequency is changed according to the element temperature so that the carrier frequency decreases with increase of the element temperature at startup of a motor. In the region B and the region C, the carrier frequency is changed according to the number of revolutions of a compression mechanism, so that the carrier frequency decreases with increase of the number of revolutions of the compression mechanism, regardless of the element temperature.

4 Claims, 8 Drawing Sheets

(52) U.S. Cl.
CPC ............. *F04B 49/103* (2013.01); *F04C 28/06* (2013.01); *F04C 28/28* (2013.01); *H02M 7/5387* (2013.01); *H02M 7/53871* (2013.01); *H02P 6/28* (2016.02); *H02P 27/085* (2013.01); *H02P 29/0088* (2013.01); *F04B 2203/0201* (2013.01); *F04B 2203/0202* (2013.01); *F04B 2203/0205* (2013.01); *F04C 18/0215* (2013.01); *F04C 29/047* (2013.01); *F04C 2240/403* (2013.01); *F04C 2240/808* (2013.01); *F04C 2240/81* (2013.01); *G06F 1/06* (2013.01); *H02H 6/00* (2013.01); *H02H 7/08* (2013.01); *H02M 1/36* (2013.01); *H02M 2001/327* (2013.01); *H02P 23/0072* (2013.01)

(56) References Cited

FOREIGN PATENT DOCUMENTS

| | | |
|---|---|---|
| JP | 2011229304 A | 11/2011 |
| JP | 2012157171 A | 8/2012 |
| WO | WO-2012042899 A1 | 4/2012 |

\* cited by examiner

ELECTRIC COMPRESSOR

CROSS REFERENCE TO RELATED APPLICATIONS

This application is a U.S. National Phase Application under 35 U.S.C. 371 of International Application No. PCT/JP2013/003553 filed on Jun. 6, 2013 and published in Japanese as WO 2014/013666 on Jan. 23, 2014. This application is based on and claims the benefit of priority from Japanese Patent Application No. 2012-158973 filed on Jul. 17, 2012. The entire disclosures of all of the above applications are incorporated herein by reference.

TECHNICAL FIELD

The present disclosure relates to an electric compressor in which an inverter circuit that drives an electric motor is cooled by an intake refrigerant taken in by a compression mechanism.

BACKGROUND ART

Conventionally, an inverter device that detects the temperature of a switching element and changes a carrier frequency according to the detected temperature is known. The inverter device is known to lower the carrier frequency in stages from an initially set frequency when the detected temperature is at least an upper limit reference temperature, and to return the carrier frequency to the initially set frequency when the detected temperature is equal to or lower than a lower limit reference temperature (refer to Patent Document 1 below).

PRIOR ART DOCUMENT

Patent Document

Patent Document 1: JP 2011-229304 A

SUMMARY OF THE INVENTION

However, the inverter device according to the conventional technology described above suppresses heat generation by the switching element by lowering the carrier frequency in stages from the initially set frequency when the detected temperature reaches the upper limit reference temperature. Accordingly, the inverter device according to the conventional technology has a problem in that switching loss is relatively large immediately after the motor startup and the like and the temperature of an inverter circuit overshoots to be likely to reach a relatively high temperature. When the temperature of the inverter circuit is excessively high, components constituting the inverter circuit may be damaged in some cases.

Another problem is that carrier noise (noise that is generated when a motor and the inverter circuit vibrate according to the carrier frequency) is likely to be generated frequently from the motor and the inverter circuit, although the switching loss can be suppressed as a result of the lowering of the frequency, since the carrier frequency is lowered whenever the detected temperature reaches the upper limit reference temperature. A user or the like may feel discomfort with the generation of the carrier noise in some cases.

The present inventor carried out extensive studies regarding both of the problems described above, and found out that both of the problems can be addressed by changing and setting the carrier frequency according to a temperature change state of the switching element and an operation state of the compression mechanism at the time of startup of the motor in a case where the inverter circuit drives the motor of the electric compressor and the inverter circuit is mounted on the electric compressor and is cooled by an intake refrigerant taken in by the compression mechanism.

A cooling effect by the intake refrigerant is extremely low immediately after the inverter circuit initiates outputting and starts up the motor. Accordingly, the temperature of the switching element rises. Then, the rise in temperature of the switching element stops when the cooling effect by the intake refrigerant is shown, and a state where the temperature is substantially constant is maintained. In some cases, the temperature slightly drops after the stopping of the rise in temperature of the switching element and then the state where the temperature is substantially constant is maintained.

In a case where the temperature changes as described above, it has been found out that the temperature rise causing the inverter circuit to reach an excessively high temperature can be limited in a temperature rise period of the switching element by setting the carrier frequency with focusing on the temperature of the switching element at the time of startup of the motor. Since a significant temperature rise change resulting in an excessively high temperature does not occur in a period after the stopping of the rise in temperature, it has also been found out that the carrier noise can be restricted by setting the carrier frequency in view of an operating sound of the compression mechanism, and the switching loss can be reduced when the user or the like has difficulty sensing the carrier noise.

The present disclosure has been made in view of the above, and an objective thereof is to provide an electric compressor capable of preventing an inverter circuit from reaching an excessively high temperature and capable of limiting switching loss while reducing discomfort of a user or the like due to carrier noise.

According to an aspect of the present disclosure, an electric compressor includes a compression mechanism that takes in and compresses a refrigerant, an electric motor that includes motor coils of a plurality of phases and drives the compression mechanism, a housing in which the compression mechanism and the motor are accommodated and an intake refrigerant that is taken in by the compression mechanism flows, an inverter circuit attached to the housing and located to be cooled by the intake refrigerant, the inverter circuit including switching elements which are provided to correspond to the plurality of phases, a physical quantity detector that detects temperatures of the switching elements or a physical quantity associated with the temperatures of the switching elements, and a controller that controls the inverter circuit to convert DC voltage into AC voltage by switching the switching elements with using a PWM wave that is generated through PWM modulation based on a result of comparison between a modulation wave, which is an application voltage command to each of the plurality of phases, and a reference carrier, the controller controlling the inverter circuit to output the AC voltage to the motor coils of the plurality of phases. The switching elements rise in temperature when the controller initiates the output of the AC voltage and starts up the motor, and the temperature rise of the switching elements stops subsequently due to cooling of the switching elements by the intake refrigerant. The controller changes the carrier frequency according to a value detected by the physical quantity detector in a temperature rise period until the stop of the temperature rise, so that the carrier frequency of the reference carrier decreases with increase of the temperature of the switching elements at the startup of the motor. The controller changes the carrier frequency according to a number of revolutions of the compression mechanism or a physical quantity associated with the number of revolutions of the compression mechanism in a post-temperature rise stop period from the stop of the temperature rise, so that the carrier frequency decreases with increase of the number of revolutions of the compression mechanism, regardless of the value detected by the physical quantity detector.

In the temperature rise period, the carrier frequency is changed according to the value detected by the physical quantity detector so that the carrier frequency of the reference carrier decreases with increase of the temperature of the switching elements at the startup of the motor. Accordingly, the number of the switching operations in the temperature rise period can be reduced and the rise in temperature of the inverter circuit can be suppressed in a case where the temperature of the switching elements at the startup of the motor is relatively high. In this manner, the inverter circuit can be prevented from reaching an excessively high temperature.

In the period after the stopping of the rise in temperature, the carrier frequency is changed according to the number of revolutions of the compression mechanism or the physical quantity associated with the number of revolutions of the compression mechanism, so that the carrier frequency decreases with increase of the number of revolutions of the compression mechanism, regardless of the value detected by the physical quantity detector. Accordingly, in the period where the cooling effect by the intake refrigerant prevents the inverter circuit from reaching an excessively high temperature, the number of the switching operations can be reduced and the switching loss can be reduced when the operating sound of the compression mechanism is relatively large. The reduction of the carrier frequency is likely to result in the generation of the carrier noise. However, the user or the like has difficulty sensing the carrier noise since the carrier frequency is reduced when the operating sound of the compression mechanism is relatively large. In this manner, the switching loss can be suppressed while the discomfort of the user or the like due to the carrier noise can be reduced.

In this manner, the inverter circuit is prevented from reaching an excessively high temperature, and the switching loss can be suppressed while the discomfort of the user or the like due to the carrier noise can be reduced.

EMBODIMENTS FOR EXPLOITATION OF THE INVENTION

Figure 1:
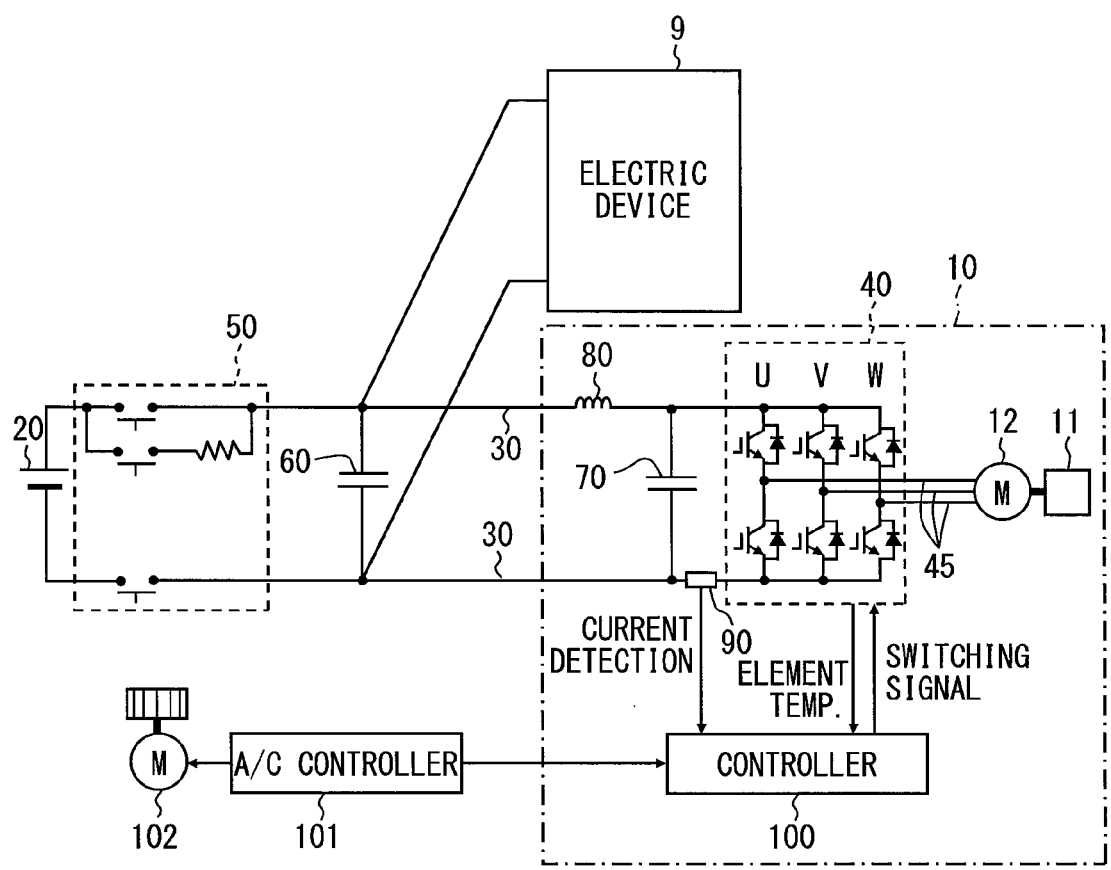
FIG. 1 is a schematic diagram illustrating a circuit including an electric compressor according to an embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

An embodiment to which the present disclosure is applied will be described with reference to FIGS. 1 to 10.

As illustrated in FIG. 1, a motor driving device of an electric compressor 10 of the embodiment drives a synchronous motor 12. The electric compressor 10 is a compressor that is arranged in a heat pump cycle of a vehicle air conditioning system using, for example, carbon dioxide as a refrigerant, and drives a compression mechanism 11 as a load with the built-in synchronous motor 12. The electric compressor 10 is an electric compressor that compresses a gas-phase refrigerant (for example, compresses a carbon dioxide refrigerant to at least critical pressure) in the compression mechanism 11 and discharges the gas-phase refrigerant. The synchronous motor 12 of the embodiment is, for example, a synchronous motor that has a four-pole three-phase coil driving a magnet-embedded rotor to rotate.

A DC power supply 20 that is illustrated in FIG. 1 is a DC voltage supply source having a high-voltage battery capable of outputting, for example, a voltage of 288 V. A high-voltage relay system 50 is arranged in a pair of buses 30 that extend from the DC power supply 20 to an inverter circuit 40. The high-voltage relay system 50 is configured to have a plurality of relays and a resistor. During high-voltage application, the high-voltage relay system 50 initiates the voltage application in a path having the resistor and then performs switching to a path not having the resistor, and functions so that no inrush current flows in the buses 30.

The high-voltage relay system 50 blocks an electric power supply path in a case where an abnormal state is detected in the electric compressor 10 or the like.

As illustrated in FIG. 1, capacitor 60 and 70 as smoothing means are interposed between the pair of buses 30, which are the electric power supply path from the DC power supply 20 to the inverter circuit 40. The capacitor 60 is provided to smoothen voltage fluctuating due to an effect from an electric device 9 that is connected to the buses 30 in parallel to the inverter circuit 40. Herein, examples of the electric device 9 include a motor driving device for vehicle traveling, a charging device, and a step-down DC/DC conversion device.

In a case where, for example, a plurality of motor driving devices are mounted on a vehicle and the electric device 9 is a motor driving device for vehicle traveling, the electric device 9 is a main driving device among the motor driving devices to which electric power is supplied from the DC power supply 20 and the driving device on the electric compressor 10 side including the inverter circuit 40 is a minor driving device. Herein, the main driving device is a device to which more input electric power is supplied from the DC power supply 20 than, for example, to the minor driving device. In some cases, the main driving device is a device to which electric power is preferentially supplied when power supply to both of the driving devices is difficult.

In a case where input electric power to the electric device 9 is larger by, for example, at least one digit than (at least 10 times) input electric power to the electric compressor 10 via the inverter circuit 40, fluctuation in voltage that is applied from the DC power supply 20 to the inverter circuit 40 via the buses 30 is likely to increase due to the effect from the electric device 9. The capacitor 60 is provided to suppress the voltage fluctuation.

The capacitor 70 is provided to absorb surge and ripple generated as a result of switching of switching elements of the inverter circuit 40.

A coil 80 is arranged between a connection point between one of the buses 30 and the capacitor 60 and a connection point between the bus 30 and the capacitor 70. The coil 80 is provided to suppress interference of the capacitors 60 and 70 that are provided in parallel between the buses 30. The coil 80 is provided so as to, for example, change resonant frequency generated by relationship between the capacitor 60 and the capacitor 70.

The coil 80 is not limited to having a coil body as a solid body, and the buses 30 between the capacitors 60 and 70 may be coil elements depending on the length, shape of winding, and the like of the coil 80.

The inverter circuit 40 has arms of the three phases of U-phase, V-phase, and W-phase corresponding to stator coils of the synchronous motor 12, and converts DC voltage input via the buses 30 into AC through PWM modulation and outputs the AC voltage.

The U-phase arm is configured to have an upper arm illustrated upward in the drawing in which the switching element and a reflux diode are in anti-parallel connection, and a lower arm illustrated downward in the drawing in which the switching element and a diode are in anti-parallel connection in the same manner, and the upper arm and the lower arm are connected in series. An output line 45, which extends from a joint between the upper arm and the lower arm, is connected to a motor coil. The V-phase arm and the W-phase arm are also similarly configured to have the switching elements and diodes, and output lines 45, which extend from joints between upper arms and lower arms, are connected to the motor coil.

An element such as an insulated gate bipolar transistor (IGBT) can be used in the switching element. The arm that has the switching element and the diode may be a switching element such as a reverse conducting insulated gate bipolar transistor (RCIGBT) which is a power semiconductor in which the IGBT and a reverse conduction diode are integrated on one chip.

Although not illustrated in the drawing, a temperature detecting device that detects the temperature of the switching elements is provided in the inverter circuit 40. The element temperature that is detected by the temperature detecting device is output to a controller 100.

The controller 100 (circuit controller) is a driving circuit unit that controls driving of the synchronous motor 12 by performing switching operation control on each of the switching elements of the inverter circuit 40. Compressor number of revolutions command information from an air-conditioning device controller 101 (hereinafter, referred to as an A/C controller in some cases) that is higher-level control means, motor coil electric current value information detected by an electric current detection unit 90 which is provided in the bus 30, switching element temperature information detected by the temperature detecting device, and the like are input into the controller 100, and the controller 100 generates a PWM wave (notch wave) that is a switching signal based on these input information and outputs the PWM wave to the inverter circuit 40.

The A/C controller 101 controls driving of a plurality of actuator mechanisms of the vehicle air conditioning system based on various setting conditions, environmental conditions, and the like. The A/C controller 101 controls driving of a motor of a blower 102, which is provided in an air-conditioning duct and blows conditioned air into a passenger compartment, via a driving circuit not illustrated in the drawing. The A/C controller 101 outputs number of revolutions information of the blower 102 to the controller 100.

Although not illustrated in the drawing, an evaporator that constitutes a refrigeration cycle device with the electric compressor 10 is arranged on a downstream side from the blower 102 in the air-conditioning duct where the blower 102 is arranged. The evaporator cools blown air. The blower 102 may be used as an example of additional equipment other than the electric compressor 10 mounted on the vehicle.

The electric compressor 10 is arranged in, for example, an engine room of a car. The electric compressor 10 constitutes the refrigeration cycle device for the vehicle air conditioning system with a condenser, a decompressor, and the evaporator.

Figure 2:
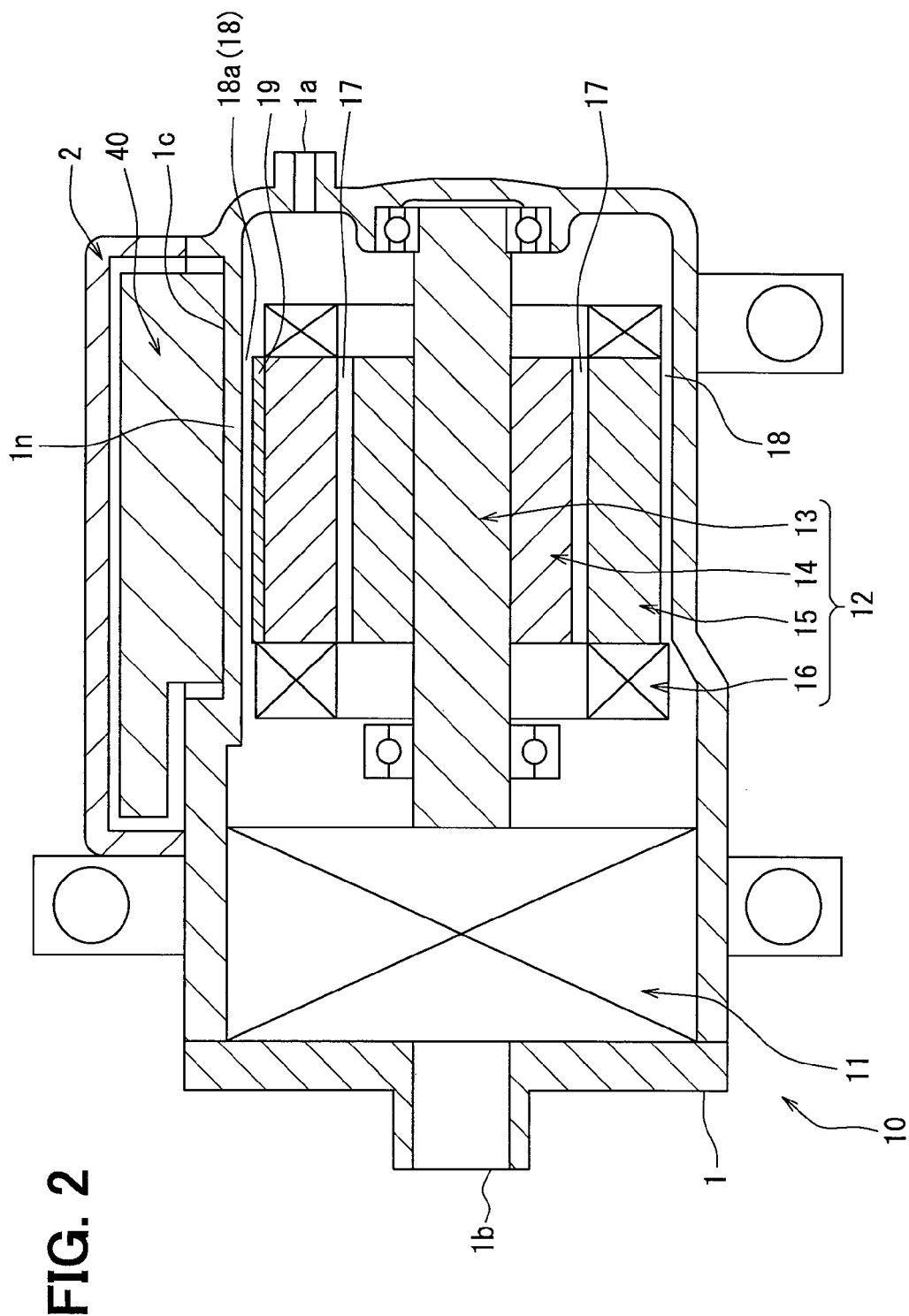
FIG. 2 is a schematic sectional view illustrating a structure of the electric compressor of the embodiment.

As illustrated in FIG. 2, the electric compressor 10 is provided with a housing 1. The housing 1 is formed of a metal with high thermal conductivity, such as an aluminum material and an aluminum alloy material, and is formed into a substantially cylindrical shape. A refrigerant intake port 1a and a refrigerant discharge port 1b are provided in the housing 1.

The refrigerant intake port 1a is arranged on one axial-direction side of the housing 1. A refrigerant from a refrigerant outlet of the evaporator flows into the refrigerant intake port 1a. The refrigerant discharge port 1b is arranged on the other axial-direction side of the housing 1. The refrigerant discharge port 1b discharges the refrigerant toward a refrigerant inlet of the condenser.

The electric compressor 10 is configured to have the compression mechanism 11, the synchronous motor 12, the inverter circuit 40, an inverter cover 2, and the like. The synchronous motor 12 is configured to have a rotating shaft 13, a rotor 14, a stator core 15, a stator coil 16 (motor coil), and the like.

The rotating shaft 13 is arranged in the housing 1. An axial direction of the rotating shaft 13 matches with an axial direction of the housing 1. The rotating shaft 13 is supported to be rotatable by two bearings. The rotating shaft 13 transmits a rotational driving force received from the rotor 14 to the compression mechanism 11. The bearings are supported by the housing 1.

The rotor 14 is, for example, embedded with a permanent magnet, is formed into a tubular shape, and is fixed to the rotating shaft 13. The rotor 14 rotates with the rotating shaft 13 based on a rotating magnetic field that is generated from the stator core 15.

The stator core 15 is arranged on a radially outer circumferential side with respect to the rotor 14 (rotating shaft 13) in the housing 1. An axial direction of the stator core 15, which is formed into a tubular shape, matches with the axial direction of the rotating shaft 13. A gap is formed between the stator core 15 and the rotor 14. The gap constitutes a refrigerant flow path 17 in which the refrigerant flows in parallel to the axial direction of the rotating shaft 13.

The stator core 15 is formed of a magnetic body, and is supported on an inner circumferential surface of the housing 1. The stator coil 16 is wound around the stator core 15. The stator coil 16 generates a rotating magnetic field.

The compression mechanism 11 is arranged on the other axial-direction side from the synchronous motor 12. The compression mechanism 11 is, for example, a scroll-type compressor that is configured to have a fixed scroll and a movable scroll. The compression mechanism 11 pivots the movable scroll by using a rotational driving force from the rotating shaft 13 of the synchronous motor 12 and takes in, compresses, and discharges the refrigerant.

The inverter circuit 40 is mounted on a mounting surface 1c of the housing 1. The mounting surface 1c is formed in an outer circumferential portion (that is, on a radially outer circumferential side of the rotating shaft 13) of the housing 1. In the embodiment, the mounting surface 1c is positioned on an upper side of the outer circumferential portion of the housing 1.

The inverter circuit 40 constitutes the driving circuit that generates three-phase voltage driving the synchronous motor 12. The inverter cover 2 is formed to cover the inverter circuit 40. The inverter cover 2 is fastened with a screw (not illustrated) to the housing 1.

A plurality of concave portions are provided in an outer circumferential wall of the stator core 15. Each of the plurality of concave portions is formed to be recessed to a radially central side of the rotating shaft 13 and extend in parallel to the stator core 15 in an axial direction.

The plurality of concave portions are arranged at regular intervals in a circumferential direction about the rotating shaft 13. Each of the concave portions constitutes a refrigerant flow path 18 between itself and the inner circumferential surface of the housing 1. Herein, a thin film-shaped insulation film 19 is provided on an inner surface of the concave portion illustrated upward in the drawing. The insulation film 19 prevents heat transfer between the refrigerant flowing in a refrigerant passage 18a of the refrigerant path 18, which is illustrated upward in the drawing, and the stator core 15.

The electric compressor 10 that is illustrated in FIG. 2 includes the configuration surrounded by the dashed line illustrated in FIG. 1, and the controller 100 and the like are also arranged in a mounting chamber for the inverter circuit 40 illustrated in FIG. 2. The controller 100 may be arranged separately from a main body of the electric compressor 10.

When a three-phase driving electric current flows in the stator coil 16 of the synchronous motor 12 illustrated in FIG. 2, the rotating magnetic field is generated from the stator core 15, and thus a rotational force is generated on the rotor 14. Then, the rotor 14 rotates with the rotating shaft 13. The rotational driving force from the rotating shaft 13 causes the compression mechanism 11 to pivot and take in the refrigerant.

In this case, the low-temperature and low-pressure intake refrigerant from the evaporator side flows into the housing 1 from the refrigerant intake port 1a. Then, the intake refrigerant passes through the refrigerant flow paths 17 and 18, and flows to the compression mechanism 11 side. The intake refrigerant is compressed by the compression mechanism 11, and is discharged from the refrigerant discharge port 1b to the condenser side.

The inverter circuit 40 generates heat when the inverter circuit 40 is in operation. The heat that is generated by the inverter circuit 40 is transmitted to the refrigerant in the refrigerant flow passage 18a through a walled portion 1n of the housing 1.

In this case, the stator coil 16 generates heat as a result of the application of the three-phase driving electric current. However, the insulation film 19 prevents heat transfer between the refrigerant in the refrigerant flow passage 18a and the stator core 15. Accordingly, the inverter circuit 40 is cooled by the intake refrigerant in the refrigerant flow passage 18a.

In addition, the heat that is generated from the stator coil 16 is transmitted through the stator core 15 to the intake refrigerant in the refrigerant flow path 17 and the refrigerant flow path 18 other than the refrigerant flow passage 18a. Accordingly, the stator core 15 and the stator coil 16 can be cooled by the intake refrigerant.

Next, a control operation by the controller 100 will be described with reference to FIGS. 3 to 7. In the following description of the control operation, region A, region B, and region C are mentioned in some cases. The region A, the region B, and the region C are, for example, regions that are illustrated in FIG. 8.

In the embodiment, the inverter circuit 40 is arranged at a position that is cooled by the intake refrigerant as described above. Accordingly, a cooling effect by the intake refrigerant is extremely low immediately after the inverter circuit 40 initiates output and starts up the synchronous motor 12, and the temperature of the switching elements rises rapidly due to heat generation resulting from a switching operation. As exemplified in FIG. 8, a temperature rise region (temperature rise period) where the temperature of the switching elements rises is the region A.

Then, the rise in temperature of the switching elements stops and the temperature drops slowly when the cooling effect by the intake refrigerant is shown. As exemplified in FIG. 8, a temperature drop region (temperature drop period) where the temperature of the switching elements drops is the region B.

When the cooling effect by the intake refrigerant is in balance with the heat generation of the switching elements after the region B, the temperature of the switching elements is maintained substantially constant in a steady state despite slight up-and-down fluctuations. As exemplified in FIG. 8, the steady region (steady period) where the temperature of the switching elements is maintained substantially constant is the region C. Herein, the region B and the region C correspond to post-temperature rise stop regions (post-temperature rise stop periods) after the stop of the rise in temperature.

The controller 100 distinguishes the three regions A, B, and C with different temperature change states of the switching elements described above, and changes carrier frequency setting operations for reference carriers (hereinafter, referred to as carriers or carrier waves in some cases) for each of the distinguished regions.

Figure 3:
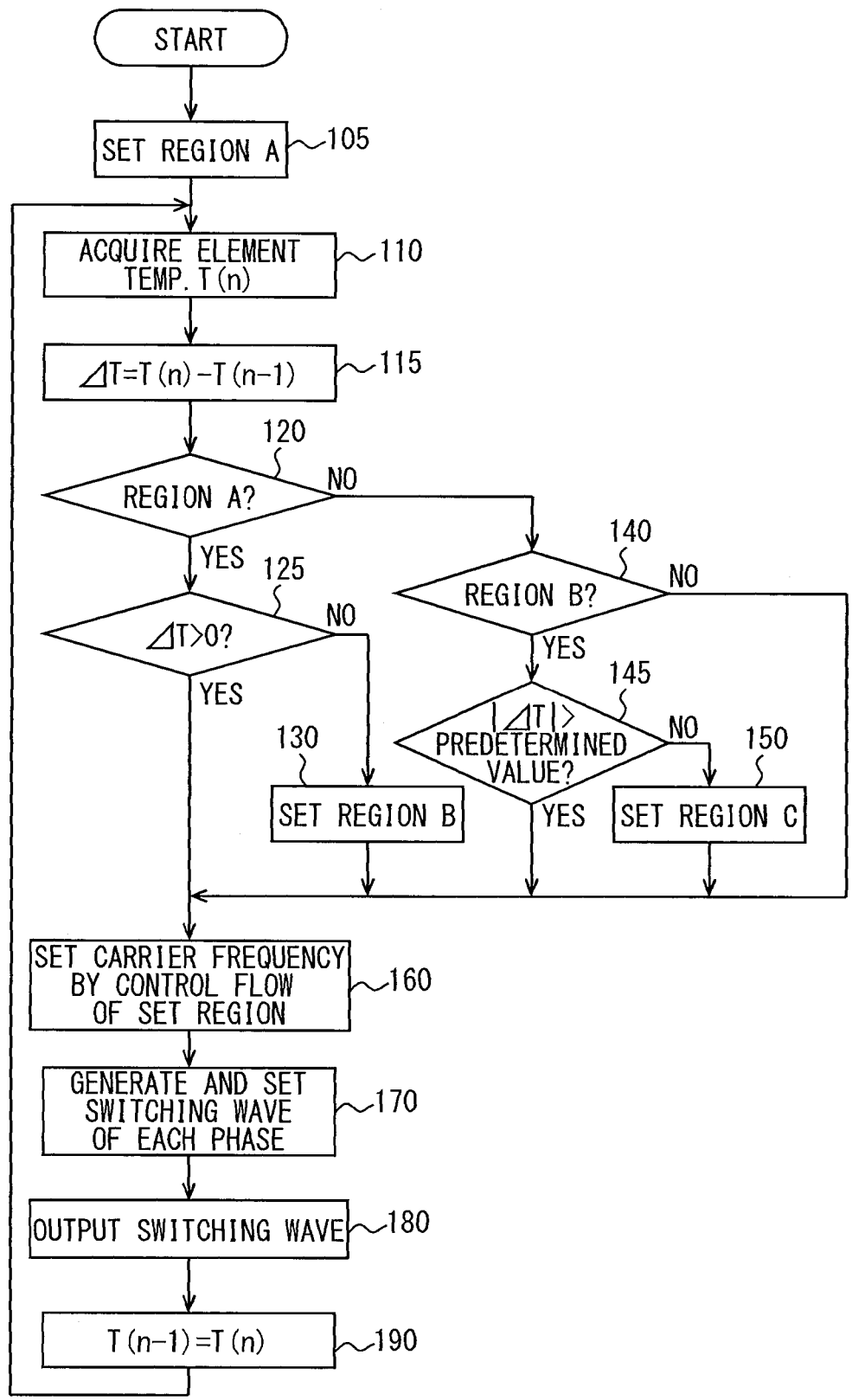
FIG. 3 is a flowchart illustrating a schematic control operation of a controller of the embodiment.

As illustrated in FIG. 3, the controller 100 first sets the region in the region A as an initial value (Step 105) when a start command for the electric compressor 10 is input. Then, the temperature T(n) of the switching elements is acquired (Step 110). A control unit, which performs the control operation of Step 110 to acquire the temperature T(n) by using the temperature detecting device that detects the temperature of the switching elements of the inverter circuit 40, may be used as an example of a physical quantity detector according to the embodiment. The temperature detecting device can also be referred to as the physical quantity detector.

After the temperature T(n) of the switching elements is acquired, ΔT, which is the difference between the temperature T(n) and the temperature T(n−1) of the switching elements acquired during the previous execution of Step 110, is calculated (Step 115). After the calculation of ΔT, it is determined whether or not the currently set region is the region A (Step 120).

In a case where the region A is determined in Step 120, it is determined whether or not ΔT, which is calculated in Step 115, is a positive value (Step 125). The process proceeds to Step 160 with the region remaining set in the region A in a case where ΔT is determined to be a positive value in Step 125, that is, in a case where the temperature of the switching elements is determined to be in a rising process.

The region is set in the region B (Step 130) and the process proceeds to Step 160 in a case where ΔT is determined not to be a positive value in Step 125, that is, in a case where the rise in temperature of the switching elements is determined to stop. In the initial flow, T(n−1) for calculating ΔT in Step 115 is not present, and thus the process proceeds to Step 160 with Step 115 and Step 125 skipped.

In a case where the set region is determined not to be the region A in Step 120, it is determined whether or not the set region is the region B (Step 140). In a case where the region B is determined in Step 140, it is determined whether or not the absolute value of ΔT, which is calculated in Step 115, is greater than a predetermined value (Step 145). The process proceeds to Step 160 with the region remaining set in the region B in a case where the absolute value of ΔT is determined to be greater than a predetermined value in Step 145, that is, in a case where the temperature of the switching elements is determined to be in a dropping process.

The region is set in the region C (Step 150) and the process proceeds to Step 160 in a case where the absolute value of ΔT is determined to be equal to or smaller than a predetermined value in Step 145. The predetermined value that is compared to the absolute value of ΔT in Step 145 is a value set in advance to be capable of excluding slight temperature fluctuation in the region C, and is determined to be capable of reliably determining whether or not the transition from the region B to the region C is performed.

In a case where the set region is determined not to be the region B in Step 140, the set region is the region C and the process proceeds to Step 160 with the region remaining set in the region C. In Step 160, a carrier frequency is set according to a control flow corresponding to the set region.

Figure 4:
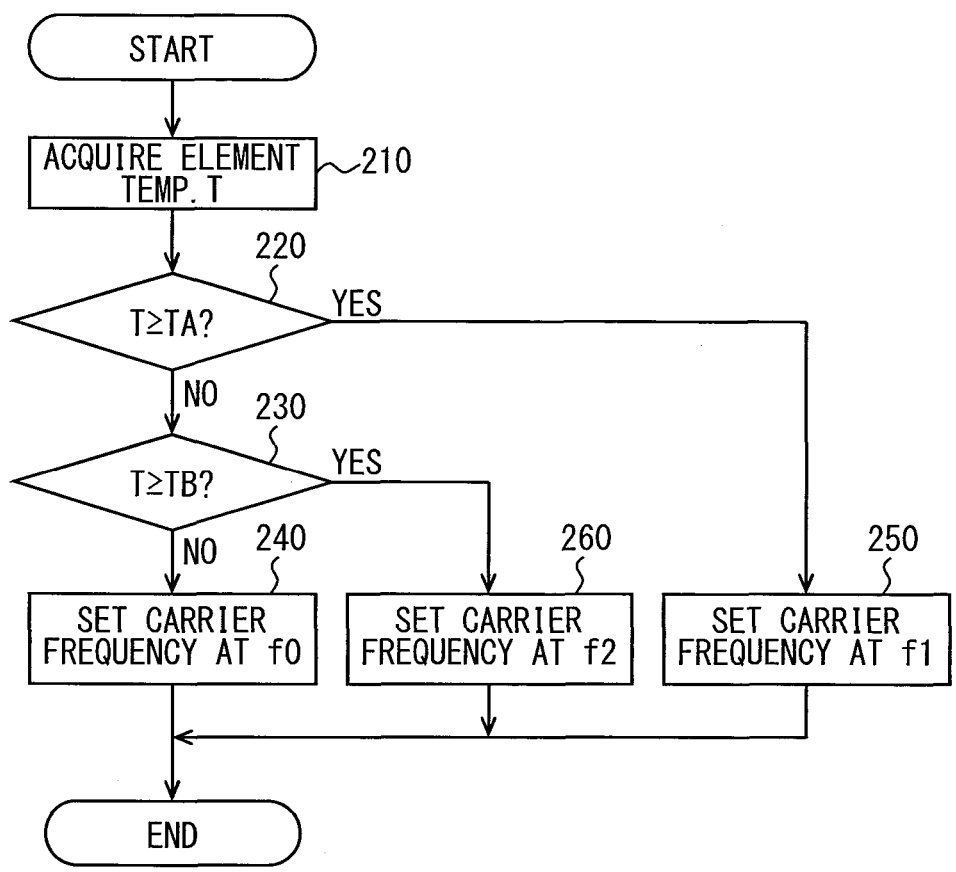
FIG. 4 is a flowchart illustrating a carrier frequency setting flow in a temperature rise region by the controller of the embodiment.

In a case where the set region is the region A, the temperature T of the switching elements is acquired first (Step 210) as illustrated in FIG. 4. The element temperature T(n) that is acquired in Step 110 illustrated in FIG. 3 can be used as the temperature T.

After the acquisition of the temperature T of the switching elements, it is determined whether or not the temperature T is at least TA (first threshold) (Step 220). In a case where the temperature T is determined to be lower than TA (determined NO) in Step 220, it is determined whether or not the temperature T is at least TB (second threshold) (Step 230). Herein, TA is higher than TB. For example, TA may be set to 115 degrees Celsius and TB may be set to 100 degrees Celsius when the allowable temperature of the switching elements is 125 degrees Celsius.

In a case where the temperature T is determined to be lower than TB (determined NO) in Step 230, the temperature of the switching elements is relatively low, and the carrier frequency is set to f0 (third frequency) (Step 240). In a case where the temperature T is determined to be at least TA (determined YES) in Step 220, the temperature of the switching elements is relatively high, and the carrier frequency is set to f1 (first frequency) (Step 250).

In a case where the temperature T is determined to be at least TB (determined YES) in Step 230, the temperature of the switching elements is an intermediate temperature that is at least TB but lower than TA, and the carrier frequency is set to f2 (second frequency) (Step 260). Herein, f0 is higher than f2 and f2 is higher than f1. For example, f1 can be 5 kHz, f2 can be 10 kHz, and f0 can be 20 kHz.

Figure 5:
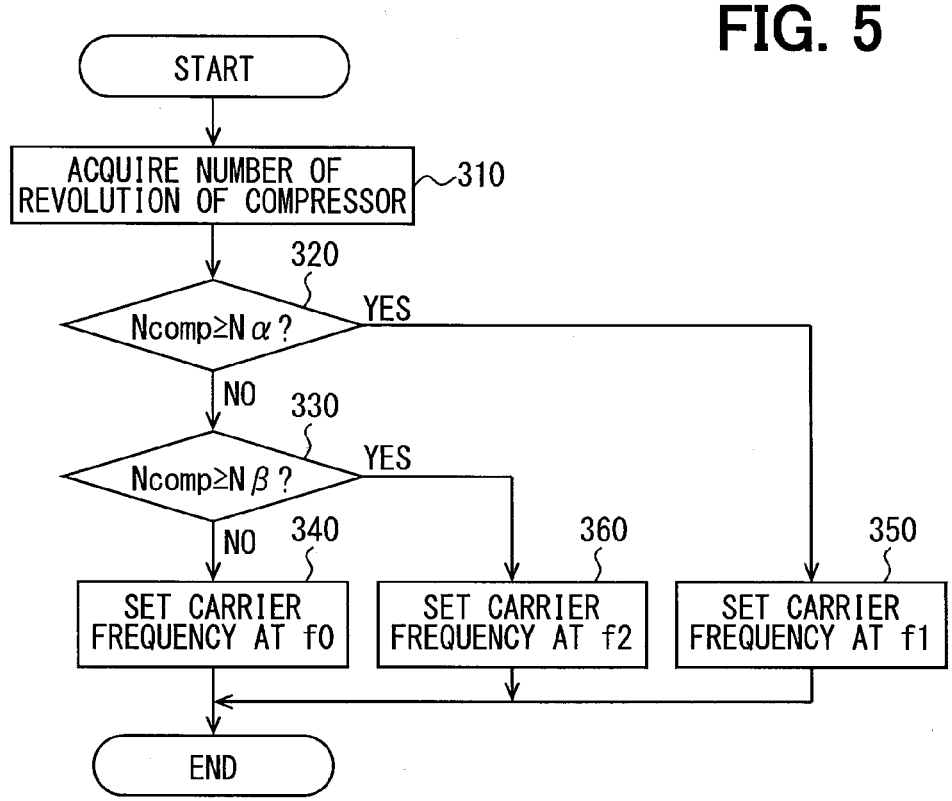
FIG. 5 is a flowchart illustrating a carrier frequency setting flow in a temperature drop region by the controller of the embodiment.

In a case where the set region is the region B during the execution of Step 160, the number of revolutions Ncomp of the compressor is acquired first (Step 310) as illustrated in FIG. 5. The number of revolutions of the compressor that is acquired herein may be an actual value of the number of revolutions of the compression mechanism 11 (that is, the synchronous motor 12) and may also be, for example, a target number of revolutions command value input from the A/C controller 101.

After the acquisition of the number of revolutions Ncomp of the compressor, it is determined whether or not the number of revolutions Ncomp is at least Nα (Step 320). In a case where the number of revolutions Ncomp is determined to be lower than Nα (determined NO) in Step 320, it is determined whether or not the number of revolutions Ncomp is at least Nβ (Step 330). Nα is higher than Nβ.

In a case where the number of revolutions Ncomp is determined to be lower than Nβ (determined NO) in Step 330, the number of revolutions of the compressor is relatively low, and the carrier frequency is set to f0 (Step 340). In a case where the number of revolutions Ncomp is determined to be at least Nα (determined YES) in Step 320, the number of revolutions of the compressor is relatively high, and the carrier frequency is set to f1 (Step 350).

In a case where the number of revolutions Ncomp is determined to be at least Nβ (determined YES) in Step 330, the number of revolutions of the compressor is an intermediate number of revolutions that is at least Nβ but lower than Nα, and the carrier frequency is set to f2 (Step 360).

Figure 6:
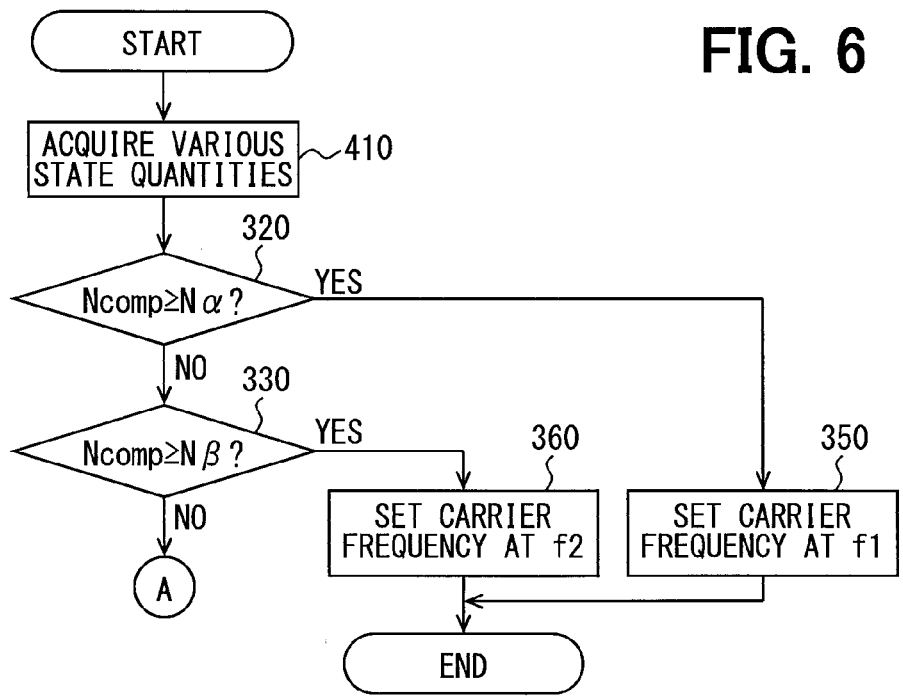
FIG. 6 is a flowchart illustrating a part of a carrier frequency setting flow in a steady region by the controller of the embodiment.

In a case where the set region is the region C during the execution of Step 160, various state quantities are acquired first (Step 410) as illustrated in FIG. 6. Herein, examples of the various state quantities include the number of revolutions Ncomp of the compressor, the number of revolutions Nblw of the blower 102, the number of revolutions Nr of a radiator fan not illustrated in FIG. 1, and vehicle traveling information.

After the acquisition of the various state quantities, Step 320 and Step 330 are executed as in the region B and size relationship between the number of revolutions Ncomp, Nα, and Nβ is determined. In a case where the number of revolutions Ncomp is determined to be at least Nα, the carrier frequency is set to f1 in Step 350 as in the region B. In a case where the number of revolutions Ncomp is determined to be at least Nβ but lower than Nα, the carrier frequency is set to f2 in Step 360.

Figure 7:
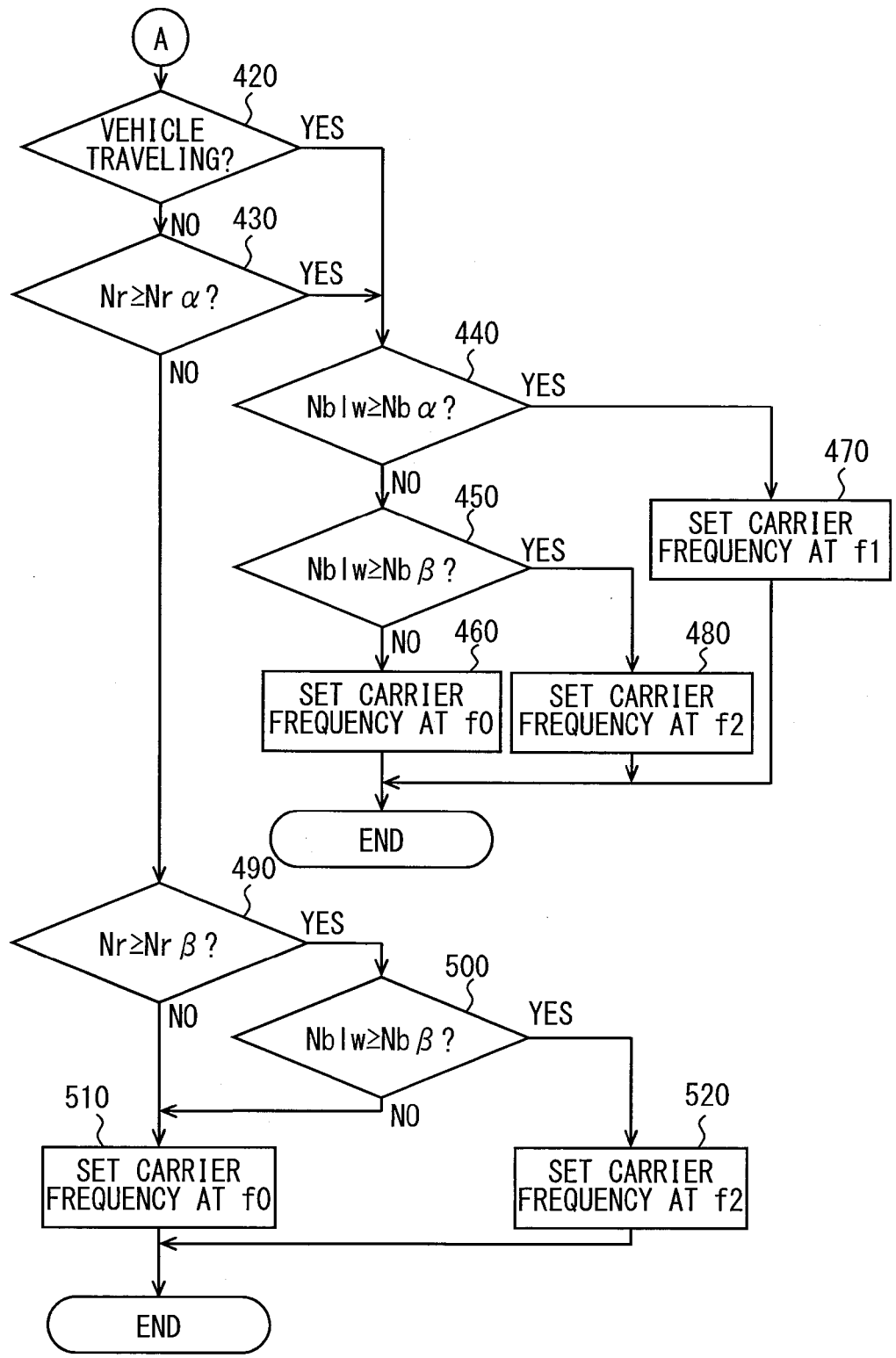
FIG. 7 is a flowchart illustrating a part of the carrier frequency setting flow in the steady region by the controller of the embodiment.
Figure 8:
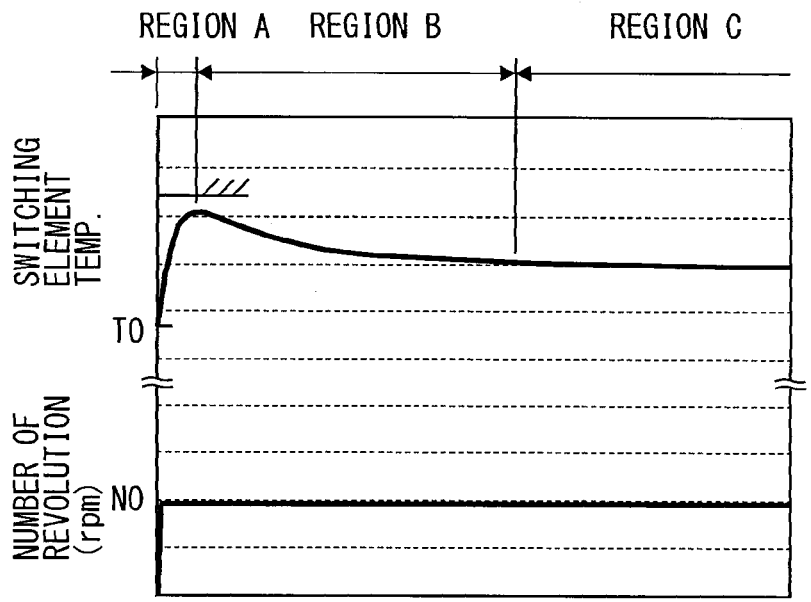
FIG. 8 is a diagram illustrating an example of element temperature change and change in the number of revolutions of the electric compressor in a case where an element temperature at startup of a motor is relatively low, according to the embodiment.

In a case where the number of revolutions Ncomp is determined to be lower than Nβ (determined NO in Step 330), the process proceeds to Step 420 illustrated in FIG. 7. In Step 420, it is determined whether not the vehicle is traveling. It is determined whether or not the number of revolutions Nr of the radiator fan is at least Nrα (Step 430) in a case where the vehicle is determined not to be traveling in Step 420, that is, in a case where the vehicle is determined to be stopped.

The process proceeds to Step 440 in a case where the vehicle is determined to be traveling in Step 420 and in a case where the number of revolutions Nr is determined to be at least Nrα in Step 430.

In Step 440, it is determined whether or not the number of revolutions Nblw of the blower 102, among the state quantities acquired in Step 410, is at least Nbα. In a case where the number of revolutions Nblw is determined to be lower than Nbα (determined NO) in Step 440, it is determined whether or not the number of revolutions Nblw is at least Nbβ (Step 450). Herein, Nbα is higher than Nbβ.

In a case where the number of revolutions Nblw is determined to be lower than Nbβ (determined NO) in Step 450, the number of revolutions of the blower is relatively low, and the carrier frequency is set to f0 (Step 460). In a case where the number of revolutions Nblw is determined to be at least Nbα (determined YES) in Step 440, the number of revolutions of the blower is relatively high, and the carrier frequency is set to f1 (Step 470).

In a case where the number of revolutions Nblw is determined to be at least Nbβ (determined YES) in Step 450, the number of revolutions Nblw of the blower is an intermediate number of revolutions that is at least Nbβ but lower than Nbα, and the carrier frequency is set to f2 (Step 480).

In a case where the number of revolutions Nr of the radiator fan is determined to be lower than Nrα in Step 430, it is determined whether or not the number of revolutions Nr is at least Nrβ (Step 490). Herein, Nrα is higher than Nrβ.

In a case where the number of revolutions Nr of the radiator fan is determined to be at least Nrβ (determined YES) in Step 490, it is determined whether or not the number of revolutions Nblw of the blower 102 is at least Nbβ (Step 500).

In a case where the number of revolutions Nblw is determined to be lower than Nbβ (determined NO) in Step 500, the carrier frequency is set to f0 (Step 510). The process proceeds to Step 510 and the carrier frequency is set to f0 also in a case where the number of revolutions Nr of the radiator fan is determined to be lower than Nrβ (determined NO) in Step 490. In a case where the number of revolutions Nblw is determined to be at least Nbβ (determined YES) in Step 500, the carrier frequency is set to f2 (Step 520).

In Steps 490 to 520, the carrier frequency is set to f0 when the radiator fan has a relatively low number of revolutions and when the number of revolutions of the blower is relatively low even when the number of revolutions of the radiator fan is the intermediate number of revolutions. In addition, the carrier frequency is set to f2 when the number of revolutions of the radiator fan is the intermediate number of revolutions and the number of revolutions of the blower is relatively high or is the intermediate number of revolutions.

After the setting of the carrier frequency according to the control flow corresponding to each of the regions in Step 160 illustrated in FIG. 3 as described above, a modulation wave that is an application voltage command to the motor coil of the synchronous motor 12 is compared to the reference carrier of the set frequency so that a switching wave, which switches the switching element of the arm of each of the phases, is generated and set as the switching wave (Step 170).

Then, the switching wave set in Step 170 is output to the arm of each of the phases so that an operation of the switching element is controlled (Step 180). After the execution of up to Step 180, the temperature T(n) of the switching elements that is acquired in Step 110 substitutes T(n−1) (Step 190), and the process returns to Step 110 for controlling of the subsequent one PWM period. The controller 100 performs switching output for each one PWM period by, for example, executing the flow illustrated in FIG. 3 every 50 μs.

According to the configuration and operation described above, the electric compressor 10 is a compressor that is cooled by the intake refrigerant so that the rise in temperature of the switching elements is stopped after the temperature of the switching elements of the inverter circuit 40 rises when the controller 100 initiates output to the stator coil 16 and starts up the synchronous motor 12.

In the region A, which is the temperature rise region before the stopping of the rise in temperature of the switching elements, the controller 100 changes the carrier frequency according to the detected temperature T so that the carrier frequency of the reference carrier decreases with increase of the temperature of the switching elements at the startup of the synchronous motor 12.

In this manner, the carrier frequency is changed according to the value detected by the temperature detecting device in the temperature rise region so that the carrier frequency of the reference carrier decreases with increase of the temperature of the switching elements at the startup of the synchronous motor 12. Accordingly, in a case where the temperature of the switching elements at the startup of the synchronous motor 12 is relatively high, the number of the switching operations in the temperature rise region can be reduced and the rise in temperature of the inverter circuit 40 can be suppressed. In this manner, the inverter circuit 40 can be prevented from reaching an excessively high temperature.

In the example shown in FIG. 4, the carrier frequency is changed in stages, so that the carrier frequency of the reference carrier decreases with the temperature increases, by comparing the temperature T to the two thresholds of TA and TB.

Accordingly, the carrier frequency in the region A is sequentially changed from f0 to f2 and then to f1 in a case where the element temperature T at the startup of the motor is T0 which is lower than TB as illustrated in FIG. 8. The carrier frequency in the region A is set to f1 in a case where the element temperature T at the startup of the motor is T1 which is higher than TA as illustrated in FIG. 9.

Figure 9:
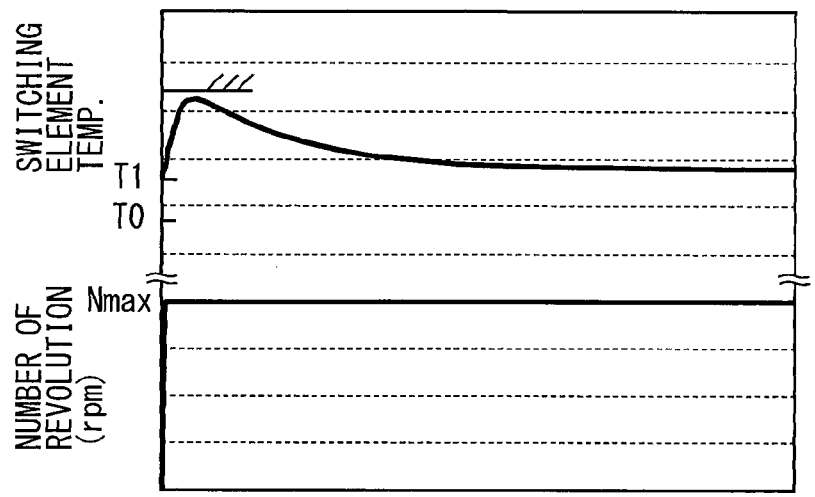
FIG. 9 is a diagram illustrating an example of element temperature change and change in the number of revolutions of the electric compressor in a case where an element temperature at startup of the motor is relatively high, according to the embodiment.

As is apparent from FIGS. 8 and 9, the number of the switching operations in the region A can be reduced and the rise in temperature of the inverter circuit 40 can be suppressed in a case where the temperature of the switching elements at the startup of the motor is T1, which is relatively high. In this manner, damage to a component including the switching elements constituting the inverter circuit 40 can be suppressed.

Figure 10:
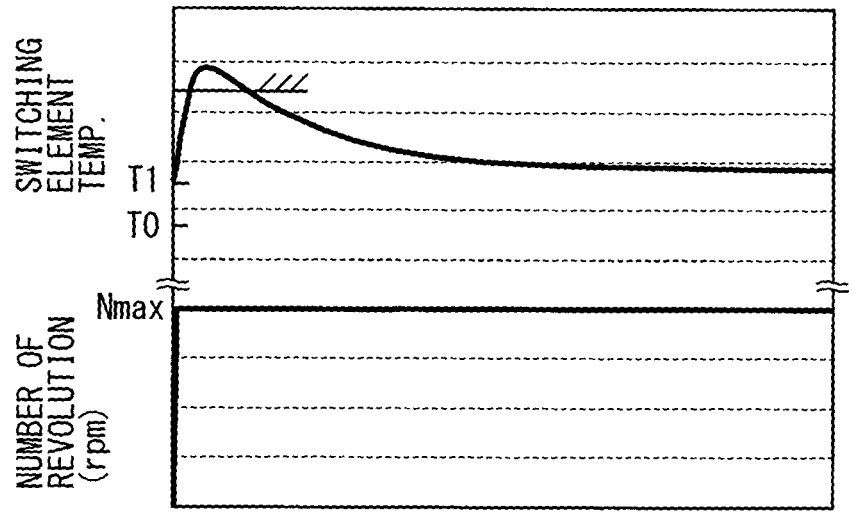
FIG. 10 is a diagram illustrating an element temperature change and change in the number of revolutions of an electric compressor in a case where an element temperature at startup of a motor is relatively high, according to a comparative example.

In a case where the carrier frequency is always f0 regardless of the element temperature T at the startup of the motor as in a comparative example that is illustrated in FIG. 10, the rise in temperature resulting from the switching operation is accelerated when, for example, the element temperature T at the startup of the motor is T1, which is higher than TA, and the allowable temperature of the component constituting the inverter circuit 40 is exceeded.

Included in this example are a case where the carrier frequency in the region A is changed in turn from f0 to f2 and then to f1 according to the temperature T at the startup of the motor, a case where the carrier frequency is changed in turn from f2 to f1, and a case where the carrier frequency is f1. However, the present disclosure is not limited thereto. For example, the carrier frequency in the region A may also be fixed to any one of f0, f2, and f1 according to the temperature T at the motor startup.

In addition, the controller 100 of the embodiment changes the carrier frequency according to the number of revolutions of the compression mechanism 11, so that the carrier frequency decreases with increase of the number of revolutions of the compression mechanism 11, regardless of the detected temperature T in the region B and the region C that are the post-temperature rise stop regions after the stopping of the rise in temperature of the switching elements.

The carrier frequency is changed according to the number of revolutions of the compression mechanism 11, so that the carrier frequency decreases with increase of the number of revolutions of the compression mechanism 11, regardless of the value detected by the temperature detecting device in the post-temperature rise stop regions. Accordingly, in an region where the cooling effect by the intake refrigerant prevents the inverter circuit 40 from reaching an excessively high temperature, the number of the switching operations can be reduced and switching loss can be reduced when an operating sound of the compression mechanism 11 is relatively large. When the carrier frequency is reduced, carrier noise is likely to be generated. However, since the carrier frequency is reduced when the operating sound of the compression mechanism 11 is relatively large (when the carrier noise can be masked), a user or the like is unlikely to sense the carrier noise. In this manner, the switching loss can be suppressed while the discomfort of the user or the like due to the carrier noise can be reduced.

As described above, the inverter circuit 40 is prevented from reaching an excessively high temperature and the switching loss can be suppressed while the discomfort of the user or the like due to the carrier noise can be reduced according to the embodiment.

The post-temperature rise stop regions are the region B that is the temperature drop region where the temperature of the switching elements drops and the region C that is the steady region where the temperature of the switching elements is maintained substantially constant after the stopping of the drop in temperature of the switching elements.

The switching loss can be suppressed while the discomfort of the user or the like due to the carrier noise can be reduced not only in the steady region where the temperature of the switching elements is substantially constant but also in the temperature drop region, where the cooling effect by the intake refrigerant is shown, in a transient region reaching the steady region from the startup of the motor. Accordingly, the switching loss can be further suppressed while the discomfort of the user or the like due to the carrier noise can be further reduced.

The electric compressor 10 is mounted on the vehicle with the additional equipment such as the rotationally driven blower 102 and the radiator fan. In a case where the number of revolutions of the compression mechanism 11 is lower than a predetermined number of revolutions (Nβ in this example) in the steady region, the controller 100 changes the carrier frequency according to the number of revolutions of the additional equipment so that the carrier frequency decreases with increase of the number of revolutions of the additional equipment.

In the steady region where the temperature of the switching elements is substantially constant, the carrier frequency is changed according to the number of revolutions of the additional equipment so that the carrier frequency decreases with increase of the number of revolutions of the additional equipment in a case where the number of revolutions of the compression mechanism 11 is lower than a predetermined number of revolutions. Accordingly, even when the operating sound of the compression mechanism 11 is relatively small, the number of the switching operations can be reduced and the switching loss can be reduced when the operating sound of the additional equipment is relatively large and the user or the like is unlikely to sense the carrier noise. Accordingly, the switching loss can be further suppressed while the discomfort of the user or the like due to the carrier noise can be further reduced.

In addition, an extremely effective example of the additional equipment described above is the blower 102 of the vehicle air conditioning system. A sound resulting from blowing of the blower 102 of the vehicle air conditioning system is extremely likely to be sensed by a passenger in the vehicle. Accordingly, the number of the switching operations can be reduced and the switching loss can be reduced when the sound resulting from the blowing of the blower 102 is relatively large and the user or the like is extremely unlikely to sense the carrier noise even when the operating sound of the compression mechanism 11 is relatively small. Accordingly, the switching loss can be further suppressed while the discomfort of the user or the like due to the carrier noise can be further reduced.

In this example, the carrier frequency is changed according to the number of revolutions Nblw of the blower 102 during vehicle traveling in a case where the number of revolutions Ncomp of the compressor is lower than Nβ and the operating sound of the compression mechanism 11 is relatively small. When the vehicle is traveling, it is unnecessary to consider the user or the like being around the vehicle. Accordingly, it is preferable to prevent the user or the like in the passenger compartment from feeling discomfort due to the carrier noise.

During vehicle traveling, the carrier frequency is changed according to the number of revolutions Nblw of the blower 102. In this manner, the number of the switching operations can be reduced and the switching loss can be reduced when the sound resulting from the blowing of the blower 102 is relatively large and the user or the like in the passenger compartment is extremely unlikely to sense the carrier noise.

In this example, the carrier frequency is changed according to the number of revolutions Nblw of the blower 102 when the vehicle is not traveling, as in vehicle traveling, in a case where the number of revolutions Nr of the radiator fan is relatively high (in a case where the number of revolutions of the radiator fan is at least Nrα). Accordingly, even when the user or the like is around the vehicle, a carrier sound is unlikely to be sensed in a case where the number of revolutions Nr of the radiator fan is relatively high and fan noise is relatively large. In a case where the vehicle is not traveling and the number of revolutions Nr of the radiator fan is relatively high, the number of the switching operations can be reduced and the switching loss can be reduced, as in vehicle traveling, when the carrier noise is extremely unlikely to be sensed by the user or the like in the passenger compartment due to a blowing sound of the blower 102.

In a case where the vehicle is not traveling and the number of revolutions Nr of the radiator fan is relatively low (in a case where the number of revolutions Nr of the radiator fan is lower than Nrβ), the fan noise is small and the carrier noise is likely to be sensed, and thus the carrier frequency is set to be high and the generation of the carrier noise is suppressed. In a case where the vehicle is not traveling and the number of revolutions Nr of the radiator fan is the intermediate number of revolutions (in a case where the number of revolutions Nr of the radiator fan is at least Nrβ but lower than Nrα), the carrier frequency is set by allowing also for the blowing sound of the blower 102 in the passenger compartment.

In the steady region where the temperature of the switching elements is substantially constant, the number of the switching operations can be reduced and the switching loss can be reduced as described above, according to a state where the carrier noise is unlikely to be sensed due to the sound generated as a result of the driving of the additional equipment, in a case where the number of revolutions Ncomp of the compression mechanism 11 is lower than a predetermined number of revolutions (in a case where the number of revolutions Ncomp of the compression mechanism 11 is lower than Nβ).

(Other Embodiment)

Hereinabove, a preferred embodiment of the present disclosure has been described. However, the present disclosure is not limited to the embodiment described above, and various modifications can be implemented without departing from the spirit of the present disclosure.

In the embodiment described above, the controller 100 performs each of the setting switching from the region A to the region B and the setting switching from the region B to the region C based on a single determination using $\Delta T$. However, the present disclosure is not limited thereto. For example, the setting switching between the regions may also be performed based on a plurality of determinations. The region setting switching may also be performed when the same predetermined condition is continuously satisfied for a plurality of times, and the region setting switching may also be performed when the average of acquired values from a plurality of times satisfies a predetermined condition.

In the embodiment described above, the controller 100 performs setting the region A, the region B, and the region C and selection setting of the carrier frequency in the region A by detecting the temperature of the switching elements of the inverter circuit 40 with the temperature detecting device. However, the present disclosure is not limited thereto. The region setting and the carrier frequency setting may also be performed by detecting a physical quantity associated with the temperature of the switching elements.

For example, the temperature of a circuit board where the inverter circuit 40 is provided and a mounting element (including a coil element, a capacitor element, and the like) other than the switching elements may be detected. In addition, the temperature of the inverter cover 2 may also be detected. In addition, state quantities such as a voltage value and an electric current value may be detected in addition to the temperature. Any detection unit that detects the temperature of the switching elements or the physical quantity associated with the temperature of the switching elements may be used as an example of the physical quantity detector.

In addition, elapsed time from the startup of the motor may also be used in setting the region A, the region B, and the region C. In a case where the elapsed time as the physical quantity associated with the temperature of the switching elements is used in the region setting, setting on a safe side (long time side where temperature change is completed with reliability) is preferable in view of a case where change in temperature of the switching elements varies due to tolerance of a component or the like.

In addition, the number of the temperature of the switching elements and the physical quantity associated with the temperature of the switching elements detected so as to perform the region setting and the carrier frequency setting may not be one but may be two or more. For example, the temperature of the switching elements and the temperature of the capacitor 70 may be used. In other words, region setting switching and the carrier frequency setting in the region A may be performed based on a plurality of pieces of physical quantity information.

In the embodiment described above, the carrier frequency is changed in the three stages of f0, f2, and f1 according to a determination condition of each of the regions. However, the present disclosure is not limited thereto. The change may also be in two stages or four or more stages. In addition, the change may be continuous instead of being in stages. In addition, carrier frequency change patterns may differ from region to region.

In the embodiment described above, the region where the temperature of the switching elements changes is distinguished into the region A, the region B, and the region C. However, the present disclosure is not limited thereto. For example, the present disclosure can also be applied effectively to a case where the temperature change is performed without the region B (temperature drop region), that is, the temperature change is performed for transition from the temperature rise region to the steady region.

In the embodiment described above, the number of revolutions of the compression mechanism 11 is used in determination in the region B and the region C. However, the present disclosure is not limited thereto. For example, the physical quantity associated with output, such as the number of revolutions of the compression mechanism, may also be used in the determination.

In the embodiment described above, the controller 100 performs different carrier frequency setting control in the region B and the region C. However, the present disclosure is not limited thereto. Common carrier frequency setting control may also be performed in the region B and the region C that are the post-temperature rise stop regions. For example, the carrier frequency setting control shown in, for example, FIG. 5 may be performed in both of the region B and the region C.

In the embodiment described above, the inverter circuit 40 is mounted on an outer surface of the housing 1, particularly, an outer surface of a so-called motor housing accommodating the synchronous motor 12 therein. However, the present disclosure is not limited thereto. The inverter circuit 40 may also be mounted at a position that is cooled by the intake refrigerant. For example, the inverter circuit 40 may be mounted on a place of the outer surface of the part (so-called compression mechanism housing) of the housing 1 accommodating the compression mechanism 11 where the intake refrigerant flows therein. In another example, the inverter circuit 40 may be mounted on an inner surface of the housing 1 to be in direct or indirect contact with the intake refrigerant.

In the embodiment described above, the electric compressor is mounted on the vehicle with the additional equipment driven to rotate and the additional equipment were the blower of the air-conditioning device and the radiator fan. However, the present disclosure is not limited thereto. For example, the additional equipment may also be another electric motor such as an electric motor for vehicle traveling or may be rotational driving bodies such as an axle and a tire.

In the embodiment described above, the synchronous motor 12 is a three-phase motor. However, the present disclosure is not limited thereto. For example, the synchronous motor 12 may also be a motor with a plurality of phases having at least four phases.

In the embodiment described above, the electric compressor 10 is for the heat pump cycle of the vehicle air conditioning system. However, the present disclosure is not limited thereto. For example, the electric compressor 10 may be for a heat pump cycle of a freezer-refrigerator mounted on a vehicle, or may be for a heat pump cycle mounted on a container. Also, the heat pump cycle may not be a movable heat pump cycle or a stationary heat pump cycle.

What is claimed is:

1. An electric compressor comprising:
   a compression mechanism that takes in and compresses a refrigerant;
   an electric motor that includes motor coils of a plurality of phases and drives the compression mechanism;
   a housing in which the compression mechanism and the motor are accommodated and an intake refrigerant that is taken in by the compression mechanism flows;
   an inverter circuit attached to the housing and located to be cooled by the intake refrigerant, the inverter circuit including switching elements which are provided to correspond to the plurality of phases;
   a physical quantity detector that detects a temperature of the switching elements or a physical quantity associated with the temperature of the switching elements; and
   a controller that controls the inverter circuit to convert DC voltage into AC voltage by switching the switching elements using a PWM wave that is generated through PWM modulation based on a result of comparison between a modulation wave, which is an application voltage command to each of the plurality of phases, and a reference carrier, the controller controlling the inverter circuit to output the AC voltage to the motor coils of the plurality of phases, wherein
   the switching elements rise in temperature when the controller initiates the output of the AC voltage and starts up the motor, and the temperature rise of the switching elements stops due to cooling of the switching elements by the intake refrigerant,
   the controller changes the carrier frequency according to a value detected by the physical quantity detector in a temperature rise period until the stop of the temperature rise, so that the carrier frequency of the reference carrier decreases with the rise in the temperature of the switching elements at the startup of the motor,
   the controller changes the carrier frequency according to a number of revolutions of the compression mechanism or a physical quantity associated with the number of revolutions of the compression mechanism in a post-temperature rise stop period from the stop of the temperature rise, so that the carrier frequency decreases with increase of the number of revolutions of the compression mechanism, regardless of the value detected by the physical quantity detector; and
   the post-temperature rise stop period is divided into a temperature drop period, during which the temperature of the switching elements drops, and a steady period, during which the temperature of the switching elements is maintained substantially constant after the temperature drop of the switching elements stops.

2. The electric compressor according to claim 1, being mounted on a vehicle with a rotary-drive additional equipment, wherein the controller changes the carrier frequency according to the number of revolutions of the additional equipment or a physical quantity associated with the number of revolutions of the additional equipment, so that the carrier frequency decreases with increase of the number of revolutions of the additional equipment, in a case where the number of revolutions of the compression mechanism is lower than a predetermined number of revolutions in the steady period.

3. The electric compressor according to claim 2, wherein the additional equipment is a blower of a vehicle air conditioning system.

4. An electric compressor comprising:
   a compression mechanism that takes in and compresses a refrigerant;
   an electric motor that includes motor coils of a plurality of phases and drives the compression mechanism;
   a housing in which the compression mechanism and the motor are accommodated and an intake refrigerant that is taken in by the compression mechanism flows;
   an inverter circuit attached to the housing and located to be cooled by the intake refrigerant, the inverter circuit including switching elements which are provided to correspond to the plurality of phases;
   a physical quantity detector that detects a temperature of the switching elements or a physical quantity associated with the temperature of the switching elements; and
   a controller that controls the inverter circuit to convert DC voltage into AC voltage by switching the switching elements using a PWM wave that is generated through PWM modulation based on a result of comparison between a modulation wave, which is an application voltage command to each of the plurality of phases, and a reference carrier, the controller controlling the inverter circuit to output the AC voltage to the motor coils of the plurality of phases, wherein
   the switching elements rise in temperature when the controller initiates the output of the AC voltage and starts UP the motor, and the temperature rise of the switching elements stops due to cooling of the switching elements by the intake refrigerant,
   the controller changes the carrier frequency according to a value detected by the physical quantity detector in a temperature rise period until the stop of the temperature rise, so that the carrier frequency of the reference carrier decreases with the rise in the temperature of the switching elements at the startup of the motor,
   the controller changes the carrier frequency according to a number of revolutions of the compression mechanism or a physical quantity associated with the number of revolutions of the compression mechanism in a post-temperature rise stop period from the stop of the temperature rise, so that the carrier frequency decreases with increase of the number of revolutions of the compression mechanism, regardless of the value detected by the physical quantity detector;

the controller sets the carrier frequency of the reference carrier to a first frequency in the temperature rise period in a case where the temperature of the switching elements at the startup of the motor is higher than a first threshold, the controller sets the carrier frequency of the reference carrier to a second frequency in the temperature rise period in a case where the temperature of the switching elements at the startup of the motor is equal to or lower than the first threshold and is higher than a second threshold that is lower than the first threshold, the controller sets the carrier frequency of the reference carrier to a third frequency in the temperature rise period in a case where the temperature of the switching elements at the startup of the motor is equal to or lower than the second threshold, the first frequency is lower than the second frequency, and the second frequency is lower than the third frequency.

* * * * *